United States Patent
Sylvain

(10) Patent No.: US 10,015,212 B2
(45) Date of Patent: Jul. 3, 2018

(54) ASYNCHRONOUS COLLABORATION SESSION LINKED TO A SYNCHRONOUS COLLABORATION SESSION

(71) Applicant: Genband US LLC, Frisco, TX (US)

(72) Inventor: Dany Sylvain, Gatineau (CA)

(73) Assignee: GENBAND US LLC, Plano, TX (US)

( * ) Notice: Subject to any disclaimer, the term of this patent is extended or adjusted under 35 U.S.C. 154(b) by 249 days.

(21) Appl. No.: 14/939,635

(22) Filed: Nov. 12, 2015

(65) Prior Publication Data

US 2017/0142170 A1 May 18, 2017

(51) Int. Cl.
*H04L 29/06* (2006.01)
*G06F 17/20* (2006.01)
*G06F 17/30* (2006.01)

(52) U.S. Cl.
CPC .... *H04L 65/4023* (2013.01); *G06F 17/30882* (2013.01)

(58) Field of Classification Search
CPC .... G06Q 10/10; G06Q 10/101; H04L 65/403; H04L 65/4023; H04L 65/4076; H04L 12/1813; H04L 12/1822; G06F 2216/15; G06F 17/30165; G06F 17/30882
USPC ........................................................ 709/205
See application file for complete search history.

(56) References Cited

U.S. PATENT DOCUMENTS

| | | | | |
|---|---|---|---|---|
| 2004/0143603 A1* | 7/2004 | Kaufmann | ............... | G09B 5/08 |
| 2005/0160396 A1* | 7/2005 | Chadzynski | ............ | G06F 9/541 |
| | | | | 717/103 |
| 2008/0254434 A1* | 10/2008 | Calvert | .................... | G09B 5/00 |
| | | | | 434/350 |
| 2009/0210801 A1* | 8/2009 | Bakir | ...................... | G11B 27/11 |
| | | | | 715/753 |
| 2013/0138671 A1* | 5/2013 | Cleaver | ................ | G06Q 10/101 |
| | | | | 707/758 |
| 2016/0247535 A1* | 8/2016 | Latulipe | ............... | G11B 27/002 |
| 2016/0337213 A1* | 11/2016 | Deutsch | ................ | H04L 43/045 |

* cited by examiner

*Primary Examiner* — Ruolei Zong
(74) *Attorney, Agent, or Firm* — Haynes and Boone, LLP

(57) ABSTRACT

Systems and methods are disclosed for starting both a synchronous communication session and an asynchronous communication session that overlap in time, and sending a digital link to users associated with the synchronous communication session that allows them to access the asynchronous communication session. The synchronous communication session includes real-time multimedia data transfer among the users associated with the session. The asynchronous communication session includes allowing users to add information to or retrieve information from the session. The asynchronous communication session persists after the synchronous communication session ends.

20 Claims, 6 Drawing Sheets

US 10,015,212 B2

ASYNCHRONOUS COLLABORATION SESSION LINKED TO A SYNCHRONOUS COLLABORATION SESSION

TECHNICAL FIELD

The present description relates, in general, to communication systems and, more specifically, to systems and techniques for providing a persistent asynchronous collaboration which is linked to one or more synchronous collaboration sessions.

BACKGROUND

Internet-based and phone-based real time communication sessions are popular ways to collaborate, and are used for everything from business meetings to customer service and technical support. These sessions may also be called synchronous collaboration sessions, and they have the advantage of allowing groups of people to have a meeting without having to be physically in the same room.

More recently, asynchronous collaboration systems have become popular. These systems allow users to post messages, data, files and the like to a central location that is accessible by other authorized users. Other users can connect to the central location at any time to view messages and retrieve data and files that have been posted there. This has the advantage of not requiring all users to be available at the same time to exchange messages.

In some cases it is desirable for a group of people to use both synchronous and asynchronous collaboration sessions to facilitate a project. In such cases, associating synchronous and asynchronous sessions would provide both functional and efficiency benefits to the users.

SUMMARY

In one example, a method comprises: starting a synchronous communication session in response to user initiation, where the synchronous communication session includes real-time multimedia data transfer among a plurality of users associated with the synchronous communication session, starting an asynchronous communication session in response to user initiation, where the asynchronous communication session is overlapping in time with the synchronous communication session and includes user access to add information to the asynchronous communication session or retrieve information from the asynchronous communication session while the synchronous communication session is ongoing, ending the synchronous communication session, sending a digital link over a network to the plurality of users associated with the synchronous communication session, the digital link providing access to the asynchronous communication session, and granting access to ones of the users for the asynchronous communication session in response to selection of the digital link.

In another example, a computing device comprises: a memory containing a machine readable medium comprising machine executable code having stored thereon instructions for performing a method of linking a synchronous communication session with an asynchronous communication session, a processor coupled to the memory, the processor configured to execute the machine executable code to: establish a synchronous communication session including sending and receiving real-time multimedia data among a plurality of users associated with the synchronous communication session, the synchronous communication session having an identifier associated with it, determine whether an asynchronous communication session exists and is associated with the synchronous communication session, based on the determination, establish an asynchronous communication session overlapping in time with the synchronous communication session and including user access to post information to the asynchronous communication session or retrieve information from the asynchronous communication session while the synchronous communication session is ongoing, the asynchronous communication session having an identifier associated with it, create a relationship between the identifiers of the synchronous and asynchronous communication sessions, send a digital link over a network to the plurality of users associated with the synchronous communication session, the digital link providing access to the asynchronous communication session, and grant access to at least a subset of the users for the asynchronous communication session in response to the activation of the digital link.

In another example, a computer program having a computer readable medium tangibly recording computer program logic, the computer program product comprises: code to connect first and second users to a synchronous communication session in response to a request from one of the first and second users, where the synchronous communication session includes one or more of real-time video, audio, and screensharing between the first and second users, code to connect the first and second users with an asynchronous communication session, where the asynchronous communication session is overlapping in time with the synchronous communication session and includes user access to add or retrieve text communication and collaboration objects from the asynchronous communication session while the synchronous communication session is ongoing, code to generate a digital link providing access to the asynchronous communication session outside of the synchronous communication session, code to end the synchronous communication session, code to send the digital link over a network to the first and second users in response to ending the synchronous communication session, and code to grant access to the first and second users, in response to selection of the digital link, for the asynchronous communication session after the synchronous communication session has ended.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Embodiments of the present disclosure describe systems and methods for associating asynchronous collaboration (AC) sessions with synchronous collaboration (SC) sessions. SC tools enable users to connect to a session at the same time, typically in the form of a voice phone call, a conference call, a video call, a video conference, or the like. AC tools enable users to connect to a session, or collaboration room, at different times to retrieve information and messages left by other users or post information and messages for other users. In some embodiments of the present disclosure, users who are taking part in an SC session are also connected to an AC session, which allows asynchronous collaboration during an SC session by sharing text messages, files, and the like as well as continued asynchronous collaboration (again, sharing messages, files and the like) between the users after the SC session has ended. In some embodiments of the present disclosure a new SC session can be initiated by users of an AC session after the initial SC session has ended.

Figure 1:
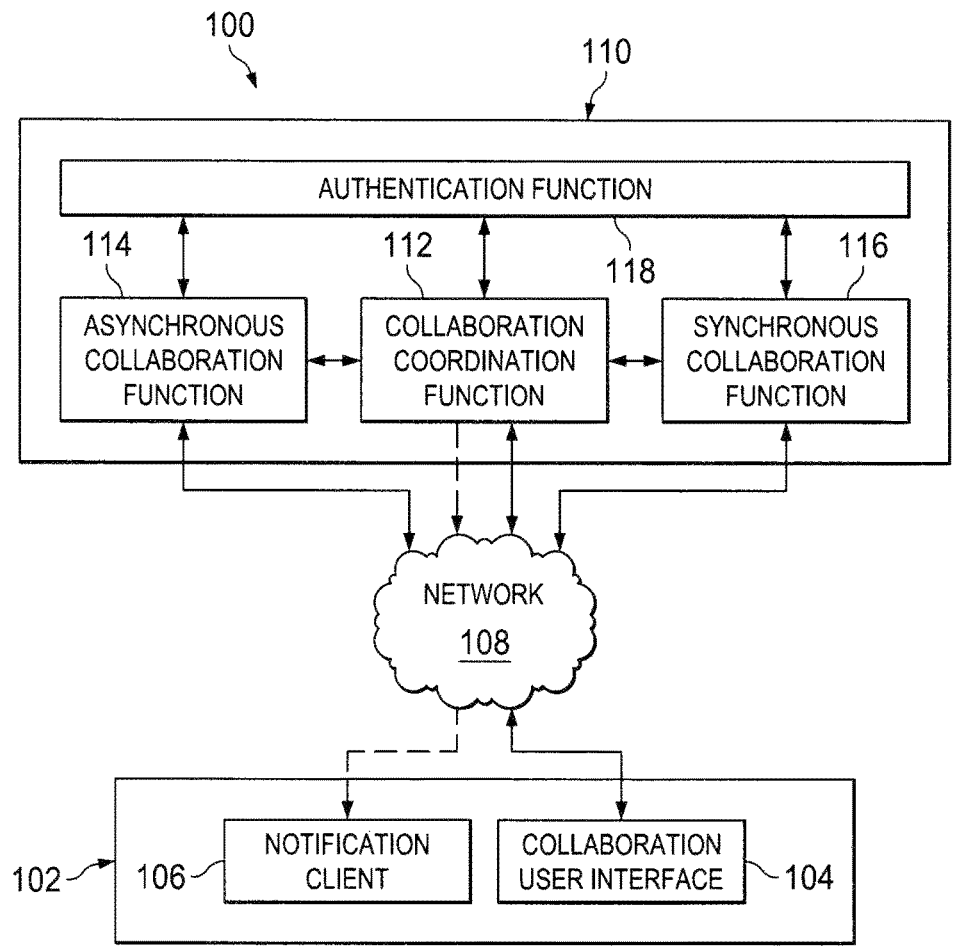
FIG. 1 is a diagram of an embodiment of a system connecting, user devices to a collaboration server and a collaboration media sever via a network.

FIG. 1 illustrates an example collaboration architecture 100 adapted according to one embodiment. The collaboration architecture 100 includes user device 102, which is associated with user A in this example. Although the example of FIG. 1 shows only a single user (user A), it is understood that various embodiments may accommodate any appropriate number of users. User device 102 may include any appropriate type of device, such as a laptop computer, desktop computer, smartphone, tablet, or the like. User device 102 may alternately be referred to as a network device. In embodiments with more than one user, each user may be associated with a user device 102.

In this example, user device 102 runs a collaboration user interface 104 that presents various collaboration functionalities to the user. For example, the collaboration user interface 104 may support synchronous collaboration (SC) sessions such as voice calls, video calls, voice conference calls, video conference calls, screensharing, application sharing, webcasts, and the like. The collaboration user interface 104 may, for example, display information to a user related to voice and video calls such as a list of users, moderators, current presenter, etc. The collaboration user interface 104 may also display video in a video call or video conference call, and play audio in audio and video calls and conferences. In another example, the collaboration user interface 104 may support asynchronous collaboration (AC) sessions by displaying instant messages, thread-based group messages, file repositories, and the like. The collaboration user interface 104 may, in these cases, display the appropriate information in a window to a user, or alongside the SC session information if an SC session is active. The collaboration user interface 104 may be part of a web page, a web application, a native application, or any other appropriate type of application.

User device 102 may also run a notification client 106, which handles notifications sent to the user device 102. In some embodiments, a notification address, such as an email address or an instant messenger user name is associated with the notification client 106. The notifications may include, for example, an invitation to an SC session, a hyperlink to an AC session, a notification that an AC or SC session has been connected to or disconnected from the user device 102, a notification that the user's privilege level in the AC or SC session has changed, and the like. In the various embodiments described, a digital link may include a hyperlink or any other appropriate type of network reference. The notification client 106 may cause a message containing the notification to be displayed to a user, it may cause an audible sound to be played, or the like. In some embodiments, the notification may be displayed in the collaboration user interface 104.

In some embodiments, the user device 102 connects to a network 108. For example, the network 108 may be a Local Area Network (LAN), a Wide Area Network (WAN), a cellular data network, the Internet, or the like. The user device 102 communicates over the network 108 with one or more collaboration servers 110. The one or more collaboration servers 110 may include any appropriate device, such as a network server, a computer, or the like.

In this example, the collaboration server 110 runs various functions such as a Collaboration Coordination function 112, an Asynchronous Collaboration function 114, a Synchronous Collaboration function 116, and an Authentication function 118.

The Collaboration Coordination function 112 coordinates between the Asynchronous Collaboration function 114, the Synchronous Collaboration function 116, the Authentication function 118, and one or more user devices 102. For example, the Collaboration Coordination function 112 may receive from user devices 102 an initial request to access an SC session or AC session and facilitate connection of the user devices 102 to the SC session or AC session. Some embodiments of this functionality are shown below with reference to FIGS. 4-6.

The Asynchronous Collaboration function 114 facilitates an AC session by communicating with the Collaboration Coordination function 112 and with one or more user devices 102, and may store messages, files, and other collaboration objects that users of the AC session may access. In some embodiments, the Asynchronous Collaboration function 114 receives messages, files, and other collaboration objects from user devices 102 and stores them to volatile or nonvolatile memory, for example in collaboration server 110.

The Asynchronous Collaboration function 114 delivers requested messages, files and collaboration objects to the user device 102 for display to a user via collaboration user interface 104. In some embodiments, the Asynchronous Collaboration function 114 receives from moderators (or other privileged users) commands to raise or lower privilege levels of users, remove users from an AC session, or the like.

The Asynchronous Collaboration function 114 delivers additional information to the user devices 102, notifying users that an AC session has been started or ended, that the user's privilege level has been raised or lowered, that the user has been removed from the AC session, or the like. In some embodiments, Asynchronous Collaboration function 114 facilitates multiple different AC sessions with different sets of users at the same time. Further functionality of the Asynchronous Collaboration function 114 is described below in FIGS. 4-6.

The Synchronous Collaboration function 116 facilitates an SC session by communicating with the Collaboration Coordination function 112 and with one or more user devices 102. The Synchronous Collaboration function 116 relays real-time communications such as streaming voice or video data between users 102 that are participating in a SC session. The Synchronous Collaboration function 116 may receive from moderators (or other privileged users) commands to mute, unmute, or remove users from an SC session. The Synchronous Collaboration function 116 interacts with the user devices 102, indicating to users that an SC session has been started or ended, that the user has been muted or unmuted, that the user has been removed from the SC session, or the like. In some embodiments, Synchronous Collaboration function 116 facilitates multiple different SC sessions with different sets of users at the same time. Further functionality of the Synchronous Collaboration function 116 is described below in FIGS. 4-6.

The Authentication function 118 facilitates authentication of user credentials when users request to join an. SC or AC session. Authentication function 118 communicates with the Collaboration Coordination function 112, receiving login credentials from users and authenticating them against a database of login credentials. For example, the Authentication function 118 may receive a user ID and password as login credentials. It may then look up the user ID in the database, retrieve a hashed password associated with the user ID, hash the password received from the Collaboration Coordination function 112, and check whether the two hashed passwords match. If so, the Authentication function 118 may return confirmation of the login credentials to Collaboration Coordination function 112. If the passwords do not match, or the user ID is not found in the database, the Authentication function 118 may return a denial of the login credentials to Collaboration Coordination function 112. In other embodiments, any appropriate method for authenticating user credentials may be performed by Authentication function 118.

In some embodiments, one or more of these functions may run on different collaboration servers 110. For example, the Synchronous Collaboration function 116, Collaboration Coordination function 112, and Asynchronous Collaboration function 114 could run on one collaboration server 110 while the Authentication function 118 runs on a second collaboration server 110. In another example, the Asynchronous Collaboration function 114, Synchronous Collaboration function 116, Collaboration Coordination function 112, and Authentication function 118 could each run on different collaboration servers 110.

In this example, the Asynchronous Collaboration function 114 may include a database that contains messages, files and various other collaboration objects which may be made available to user devices 102 that are participating in an AC session. Collaboration objects may include, for example, meeting minutes, a list of meeting attendees for various meetings, a list of team members on a project, an action item list, a schedule, project objectives, a structured repository, recordings of previous SC sessions, and the like. Users participating in an AC session may store messages, collaboration objects, and any other appropriate data on the Asynchronous Collaboration function 114 for viewing and retrieval by other users of the AC session.

Figure 2:
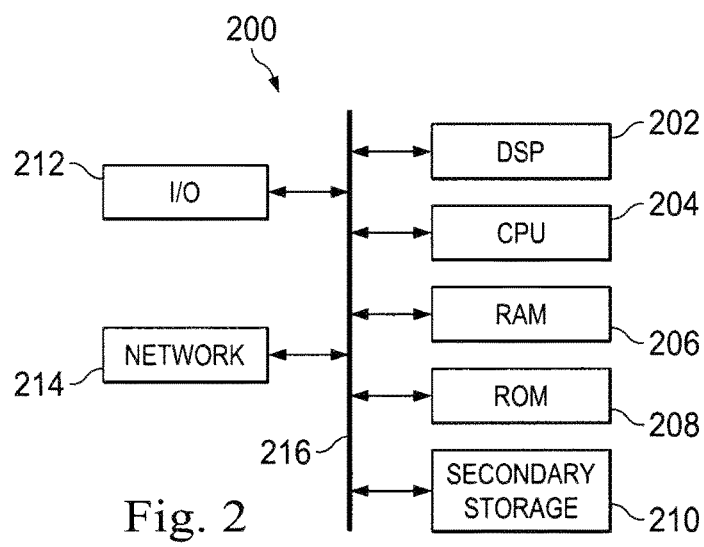
FIG. 2 is an illustration of an example computer system adapted according to an embodiment of the present disclosure.

FIG. 2 illustrates an example computer system 200 adapted according to one embodiment of the present disclosure. The computer system 200 includes an example system on which embodiments of the present disclosure may be implemented (such as collaboration server 110 or user devices 102). The computer system 200 includes a digital signal processor (DSP) 202, a central processing unit (CPU) 204, a random access memory (RAM) 206, a read-only memory (ROM) 208, secondary storage 210, input/output (I/O) devices 212, and a network interface 214, all of which may be communicatively coupled via a bus 216.

The CPU 204 may be implemented using hardware or a combination of hardware and software. Although illustrated as a single CPU, the CPU 204 is not so limited and may include multiple processors. The CPU 204 may be implemented as one or more processors, i.e., as one or more chips, cores (e.g., a multi-core processor), field-programmable gate arrays (FPGAs), and/or application specific integrated circuits (ASICs). Likewise, the DSP 202 may be implemented as more than one DSP chip. The DSP 202 may perform transcoding or transrating of a media stream or call flow received by a network interface 214.

The secondary storage 210 may comprise one or more disk drives or solid state drives and is used for non-volatile storage of data and as an over-flow data storage device if the RAM 206 is not large enough to hold all working data. The RAM 206 may be static RAM, dynamic RAM, or the like, and the ROM 208 may be programmable ROM (PROM), erasable PROM (EPROM), electrically EPROM (EEPROM), or the like. The secondary storage 210 may be used to store programs that are loaded into the RAM 206 when such programs are selected for execution. The ROM 208 is used to store instructions and perhaps data that are read during program execution. The ROM 208 is a non-volatile memory device that typically has a small memory capacity relative to the larger memory capacity of the secondary storage. The RAM 206 is used to store volatile data and perhaps to store instructions. Access to both the ROM 208 and the RAM 206 is typically faster than to the secondary storage 210.

The computer system 200 includes network interfaces 214. There may be a network interface 214 for each communication line (e.g., electrical or optical) coupled to the computer system 200. A network interface 214 may be bidirectional or unidirectional, depending on the embodiment. Each network interface 214 is adapted to couple computer system 200 to a communication link (e.g., a wired or wireless communication link). In the examples of FIG. 1, network interfaces 214 may couple a respective device to network 108 and/or to another network (not shown) such as a wireless network, cellular network or other telephony network.

The I/O devices 212 may include a keyboard, a computer mouse, a microphone, and/or a display device for allowing a user to provide input to and receive output from the computer system 200. In one example, the user device 102 of FIG. 1 may include tablet computers having touchscreen interfaces, although the scope of embodiments is not limited to any particular I/O devices 212.

It is understood that by programming and/or loading executable instructions onto the computer system 200, at least one of the CPU 204, the RAM 206, and/or the secondary storage 210 are changed, transforming the computer system 200 in part into a particular machine or apparatus having the functionality taught by the present disclosure. The executable instructions may be stored on the RAM 206 or secondary storage 210 and loaded into the CPU 204 for execution. The device functionality described with respect to FIGS. 1 and 3-6 may be implemented as a software application running on the CPU 204 and using the RAM 206, the ROM 208, and/or secondary storage 210.

Logic may be encoded in a non-transitory computer-readable medium, such as RAM 206 and/or secondary storage 210. Such a medium can take many forms, including but not limited to, non-volatile media and volatile media. In various implementations, non-volatile media includes optical or magnetic disks, such as secondary storage 210, and volatile media includes dynamic memory, such as various types of RAM 206. CPU 204 reads application code from the readable medium and executes the code to provide the described functionality.

Figure 3:
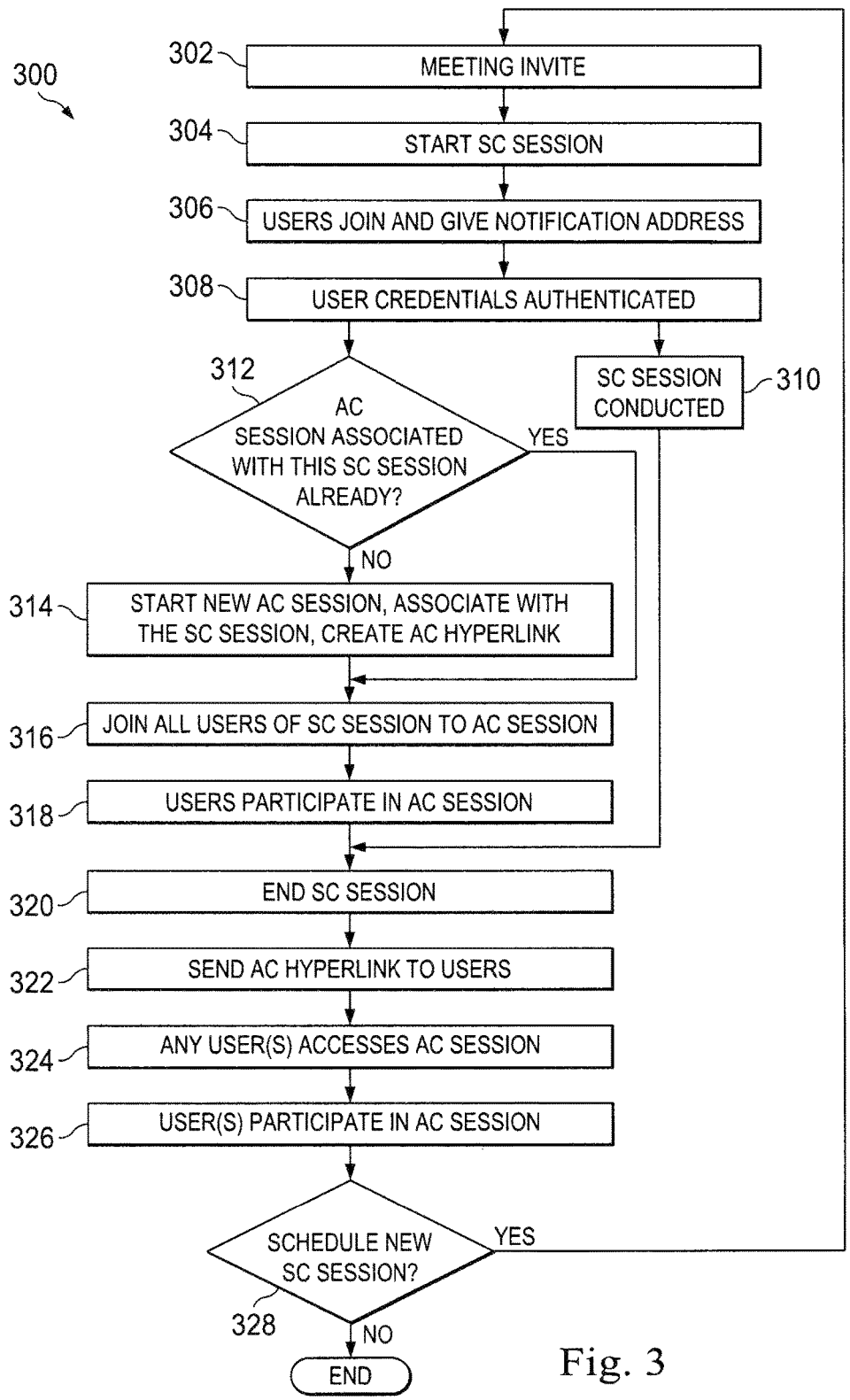
FIG. 3 is a flowchart illustrating a method for starting synchronous and asynchronous collaboration sessions, associating the synchronous and asynchronous collaboration sessions, and providing users of the synchronous collaboration session with access to the asynchronous collaboration session.

FIG. 3 is a flow diagram of a method 300 for participating in associated asynchronous and synchronous collaboration sessions. Beginning at block 302, a user, for example User A, creates a meeting invitation for an SC session which is sent to the notification client 106 of various user devices 102. The meeting invitation may be sent using a scheduling or calendar application shared by users, or it may be passed on by email, instant messaging, or the like. The meeting invitation may include a hyperlink, such as a URL.

Moving to block 304, an SC session is started by the Synchronous Collaboration function 116. This may be initiated by any user attempting to access the SC session via the meeting invitation, for example by activating, or selecting, the hyperlink. In some embodiments, only a subset of authorized or privileged users, such as a moderator, may initiate the SC session. The SC session may have an identification object associated with it for purposes of identifying the SC session. The identification object may be a token or any other appropriate type of identifier. A token may be, for example, a string that serves as a unique identifier of the session. SC tokens may be created by the Synchronous Collaboration function 116 upon creation of the SC session, for example by use of a random number generator to generate an alphanumeric string, or by running a hash function with an arbitrary input.

The SC token may be sent to the Collaboration Coordination function 112, to users who are authorized to access the SC session, and to a database that the various functions can access to see a list of active SC sessions. The database may, for example, contain entries relating SC tokens to other information about the SC session, such as an address for a host server for the SC session. In other embodiments, any appropriate data structure may be used in place of a database. In future communications with the Synchronous Collaboration function 116, the SC token is provided to inform the function which SC session the communication is referring to so that the Synchronous Collaboration function 116 may handle the communications properly, for example by sending the communications to a host server for the SC session. Similarly, when a user communicates with the Collaboration Coordination function 112 and vice versa, the SC token may be included to let the user or the function know which SC session is being referenced, and accordingly how to handle the communication.

Moving to block 306, users may join the SC session by providing login credentials such as a user ID and password. Users who join the SC session are connected to an audio call, video call, or other type of SC session via their collaboration user interface 104. Additionally, when users connect to the SC session they may be prompted for a notification address, for example an email address. In some embodiments, the notification address may be retrieved from a user database, based on the user ID provided. In some embodiments the user database may be part of the collaboration server 110, or alternatively the user database may be stored elsewhere.

Users may also join the SC session without providing login credentials, for example if they are external guest users who were invited to an SC session. In this scenario, the guest users would need to provide their name so that other participants can recognize them, as well as a notification address.

Moving to block 308, the user's login credentials are authenticated by the Authentication function 118 as described above. Different users may be given different permissions in the SC session by the SC function. For example, a user may be designated as the host or moderator of the SC session, and given the ability to mute other users, remove other users from the session, invite new users to the session, end the session, etc. Other users may be designated as participants or presenters and allowed to talk on the call, but not allowed to mute others, remove others from the session, end the session or anything else. Other users may only be allowed to listen to the call or view the video. The level of permission granted to a user of the SC session may be restricted based on whether or not the Authentication function 118 is able to authenticate the user.

Moving to block 310, users who have joined the SC session participate in the SC session. For example, users may listen to an audio conference call, watch a video conference call, speak on an audio conference call, present on a video conference call, or the like. This communication between users in the SC session is handled by the Synchronous Collaboration function 116.

Moving to decision block 312, the Collaboration Coordination function 112 determines whether there is an AC session already associated with the SC session. For example, the Collaboration Coordination function 112 may receive from the moderator of the SC session an identifier (e.g. a token) for an associated AC session. The token may be created by the Asynchronous Collaboration function 114 upon creation of the AC session, for example by use of a random number generator to generate an alphanumeric string, or by running a hash function with an arbitrary input.

In another example, upon creation the AC token may be sent to the Collaboration Coordination function 112, to users who are authorized to access the AC session, and to a database that the various functions can access. The database may, for example, contain entries relating AC tokens representing active AC sessions to SC tokens representing active and scheduled SC sessions. The entries may relate tokens for associated AC and SC sessions, allowing the Collaboration Coordination function 112 to consult the database to discover whether an SC session is linked to an AC session or vice versa. At decision block 312, the moderator of the SC session may simply send an SC token identifying the SC session to the Collaboration Coordination function 112, which may then check the database to see if an AC session is associated with the SC session.

If there is no AC session associated with the SC session, the method proceeds to block 314 and the Asynchronous Collaboration function 114 begins a new AC session. The Asynchronous Collaboration function 114 may also associate the AC session with the SC session as described above.

Moving to block 316, the users of the SC session are automatically given access to the AC session via their collaboration user interface 104. The Asynchronous Collaboration function 114 facilitates this connection as described below in diagram 400 of FIG. 4.

Moving to block 318, users may post or retrieve messages, data, collaboration objects and the like to the AC session while they are simultaneously participating in the SC session. Posting may be done by sending the messages, data, or collaboration objects to the Asynchronous Collaboration function 114, which handles storing of such items. Retrieval may be done by requesting the data from the Asynchronous Collaboration function 114, which handles retrieval of such items. Certain items, like text messages, may be automatically retrieved by the user device 102 as when it connects to the AC session.

In some embodiments, only one user (e.g., a presenter) may be allowed to talk in the SC session, but the users may be able to post messages, files, collaboration objects and the like to the AC session while listening to the presenter in the SC session. In other embodiments, different sets of users may be given different privilege (or permission) levels in the AC session. In another example, some users may have full access to all functions including deleting messages and collaboration objects. Other users may only be able to post or view messages and collaboration objects, but not delete any messages or collaboration objects. Other users may only be able to view messages and collaboration objects but not post or delete them. The level of permission granted to a user of the AC session may be restricted based on whether or not the Authentication function 118 is able to authenticate the user.

Returning to decision block 312, if the Collaboration Coordination function 112 determines that there is a pre-existing AC session associated with the group of users, then the method proceeds to block 316 and users joining the SC session may be automatically connected to the AC session as described above.

Moving to block 320, the SC session is ended, as described further below in diagram 500 of FIG. 5. In some embodiments, this includes disconnecting the users from the SC session (e.g., the conference call is ended), and may be initiated by a moderator. In other embodiments, this may include any single user deciding to leave the SC session, while the SC session continues for other users.

Moving to block 322, the Asynchronous Collaboration function 114 automatically sends data to access an AC session (e.g., a hyperlink or other kind of link) to each user who is associated with the SC session. In some embodiments, this is the users who participated in the SC session or a subset thereof. This may occur when the SC session is ended (e.g., the conference call is ended). This may alternatively occur when a user decides to leave the SC session. This may alternatively occur as soon as the user joins the SC session. The hyperlink may be sent to the notification address provided when the user joined the SC session, for example the user's email address or session initiation protocol (SIP) address. This may include sending the hyperlink to the notification client 106 of the user's user device 102. The hyperlink may alternatively be provided through a meeting invitation. The hyperlink may be provided only to users who are authenticated by the Authentication function 118. The hyperlink may point to a URL, an FTP address, or any other suitable address of the AC session data and may or may not include a token identifying the AC session.

Moving to block 324, any user may access the AC session at any time. This may be done by, for example, activating or selecting the AC session hyperlink provided in block 322, as further described below in diagram 600 of FIG. 6. The AC session hyperlink may require the user to re-enter his login credentials in order to activate the hyperlink. The Asynchronous Collaboration function 114 may request login credentials from the user and send them to Authentication function 118 for verification before granting access to the AC session.

Moving to block 326, the user or users participate in the AC session. In some embodiments, the AC session functions the same as in block 318. The AC session may have a different UI when accessed during an SC session (i.e., as in block 318) than it does when accessed outside of an AC session (i.e., as in block 326). As mentioned above with respect to block 318, the AC session may contain messages, hyperlinks, files, other collaboration objects, and the like posted by other users. As mentioned above with respect to block 318, various users may have different privilege levels within the AC session.

Moving to block 328, a user of the AC session in block 326 may schedule a new SC session. In this case, the method 300 continues back to block 302, and a new SC session invitation is sent out to the users associated with the AC session. The new SC session may be linked to the existing AC sessions or may be independent. Examples of linking the new SC session to existing AC sessions includes relating an SC token and an AC token in a database or other suitable data structure. Accordingly, there is a logical relationship between an AC session and one or more SC sessions. A given SC session may be initiated, exist, and complete while a related AC session persists for a set period of time or indefinitely. Thus, although an SC session and an AC session may overlap in time or be concurrent, while the SC session may eventually end the AC session may persist and be accessible to the users. The system uses the logical relationship (e.g., as defined by entries in the database having tokens or other suitable data structure) to be able to access an AC session that is related to an SC session and/or initiate a new SC session related to the AC session.

Figure 4:
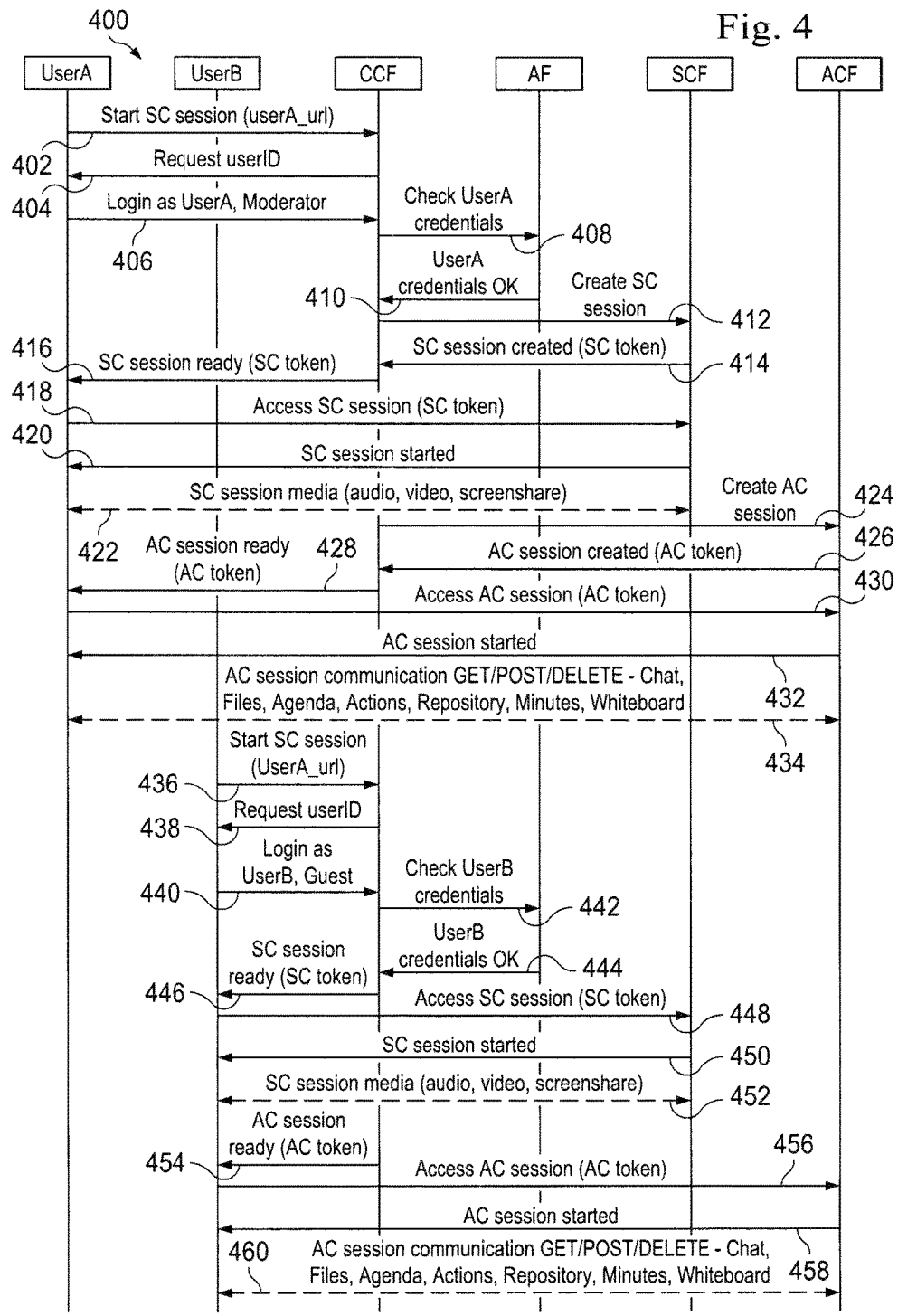
FIG. 4 is an illustration of an example signal flow diagram according to one embodiment for starting synchronous and asynchronous collaboration sessions.
Figure 5:
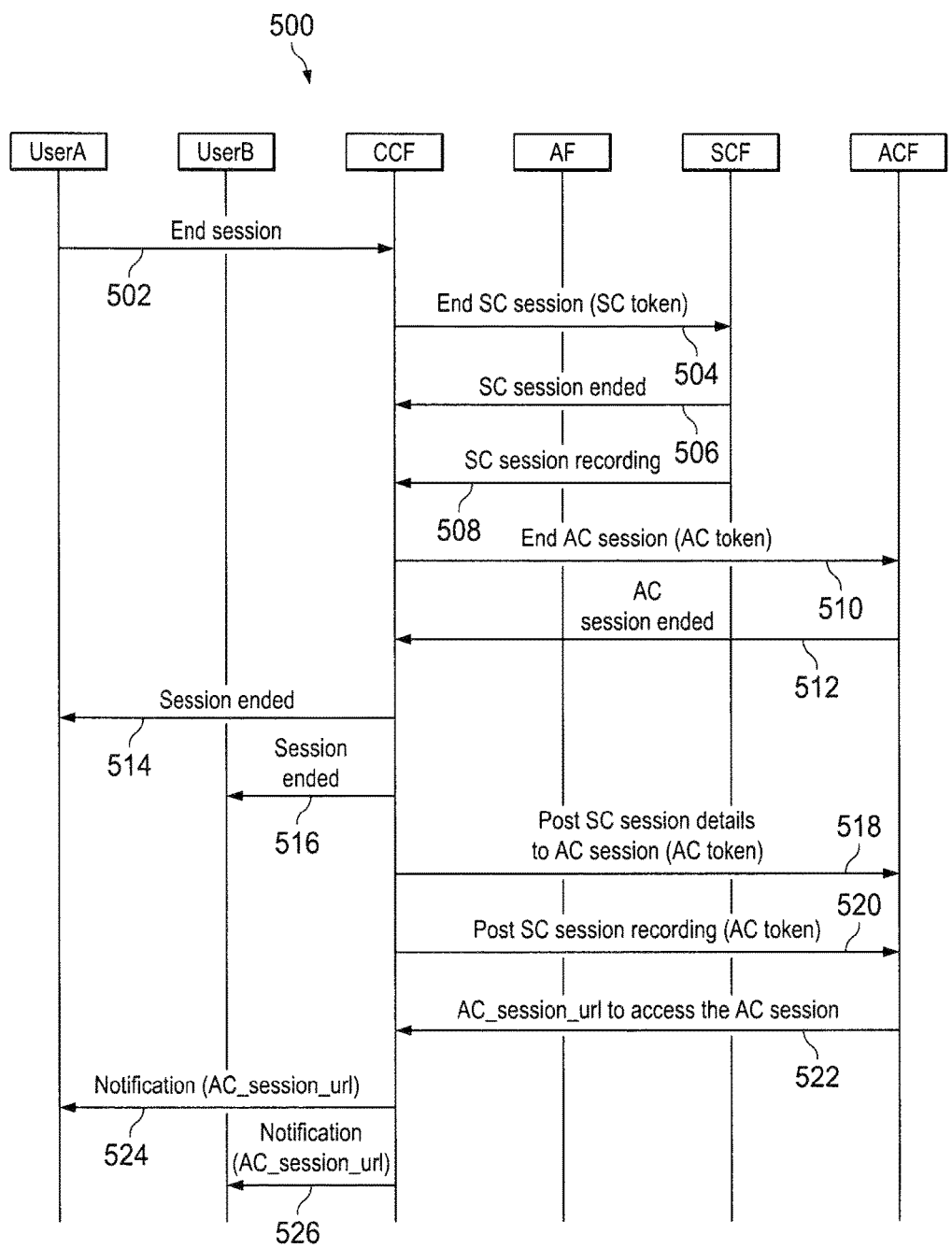
FIG. 5 is an illustration of an example signal flow diagram according to one embodiment for ending a synchronous collaboration session.
Figure 6:
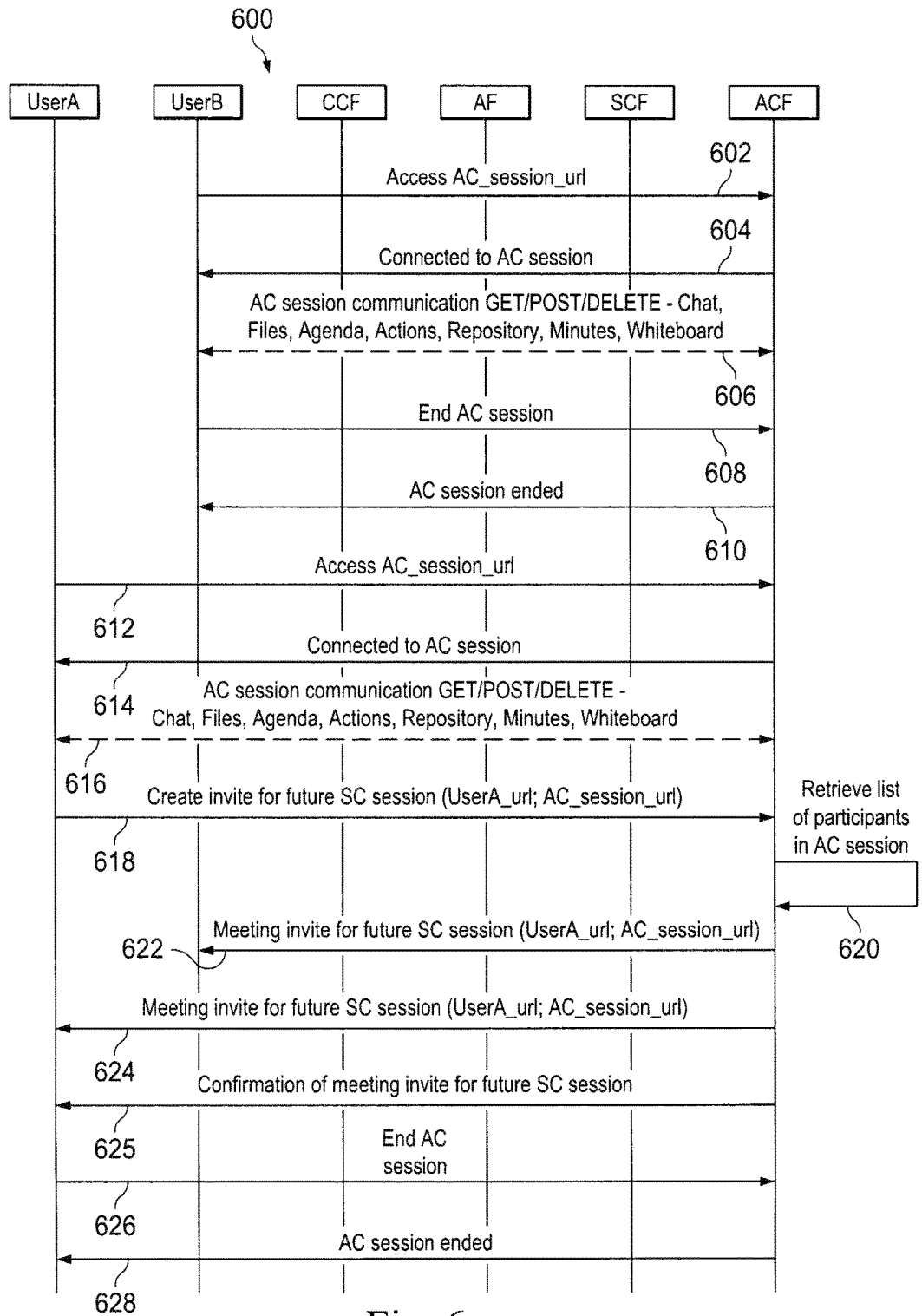
FIG. 6 is an illustration of an example signal flow diagram according to one embodiment for accessing an asynchronous collaboration session after the synchronous collaboration session has ended.

FIGS. 4-6 shows signal diagrams illustrating how the Collaboration Coordination function 112 coordinates with the Asynchronous Collaboration function 114 and the Synchronous Collaboration function 116 to associate an AC session with an SC session to facilitate the method 300 described in FIG. 3. For simplicity's sake, only two users (A and B) are shown, but any number of users may participate in the SC sessions and AC sessions of the present disclosure.

FIG. 4 shows a signal diagram 400 illustrating the creation of an SC session and an AC session linked to the SC session. It is understood that signal diagram 400 is one embodiment, and the actions shown in signal diagram 400 may be performed in a different order in other embodiments. Communications that take place in, the actions of signal diagram 400 may be conducted with HTTP, SIP, or any other appropriate protocol.

Beginning at action 402, a first user, called user A in this example, operating a user device 102, sends a request to the Collaboration Coordination function 112 to create a new SC session as a moderator. This request may be launched by activating a hyperlink in a calendar appointment, meeting invite, or the like.

Moving to action 404, the Collaboration Coordination function 112 requests login credentials from user A. Moving to action 406, user A provides login credentials in the form of a user ID (e.g, user A's name, employee number, etc.), a privilege level (in this example, moderator), and a password. Moving to action 408, Collaboration Coordination function 112 passes user A's login credentials to Authentication function 118, which authenticates user A's login credentials as described above. Moving to action 410, Authentication function 118 sends confirmation to Collaboration Coordination function 112 that user A's login credentials are valid. In other embodiments where the user's login credentials are invalid, the Authentication function 118 will return a denial of authentication to Collaboration Coordination function 112. In such a case, Collaboration Coordination function 112 may prompt user A for new login credentials.

The Collaboration Coordination function 112 may also request a notification address from user A at action 404. As described above, the notification address is used to send notifications to the notification client 106 of the user device 102. As described above, notifications may include various notifications such as an invitation to an SC session or a hyperlink to an AC session.

Moving to action 412, the Collaboration Coordination function 112 sends a request to the Synchronous Collaboration function 116 for creation of the new SC session. Moving to action 414, the Synchronous Collaboration function 116 handles creation of the SC session and an associated SC token, and sends the SC token back to the Collaboration Coordination function 112. In this embodiment, the SC token is an identifier for the SC session which is used in future requests for access to the SC session. In the case that the Synchronous Collaboration function 116 is coordinating multiple SC sessions at once, each will have a unique SC token that allows users to access the correct SC session. Moving to action 416, the Collaboration Coordination function 112 sends a notification to the notification client 106 of user A's user device 102 that the SC session is ready, and provides the SC token to user A's user device 102.

Moving to action 418, user A's user device 102 accesses the SC session by providing the SC token to the Synchronous Collaboration function 116, which connects user A's user device 102 to the SC session identified by the provided SC token. Moving to action 420, the Synchronous Collaboration function 116 sends a message to user A's user device 102 indicating that it is connected to the SC session.

Moving to action 422, user A participates in the SC session as a moderator. User A may be given elevated privileges as a moderator, including the ability to mute or disconnect guest users. User A's user device 102 and the Synchronous Collaboration function 116 communicate back and forth to send the necessary information between the user device 102 and the Synchronous Collaboration function 116 to facilitate real time synchronous communications, e.g. real time multimedia data transfer, with other participants of the SC session. The information may include voice data, video data, screensharing data, and the like, packaged as required for appropriate technologies such as Voice Over IP (VoIP), MP4 RTSP, RTP, WebRTC, or any other protocol appropriate for transfer of real-time media.

Moving to action 424, the Collaboration Coordination function 112 recognizes that no AC session has been associated with the newly created SC session. The Collaboration Coordination function 112 may recognize, for example, that no AC token was included with the request to start a new SC session in action 402. The Collaboration Coordination function 112 may also query a database that tracks which AC sessions and SC sessions are associated with each other, as described above with reference to block 312 of FIG. 3, and find that no AC sessions are associated with the SC session. Continuing with action 424, the Collaboration Coordination function 112 automatically sends a request to create a new AC session to the Asynchronous Collaboration function 114.

Moving to action 426, the Asynchronous Collaboration function 114 handles creation of the new AC session and an associated AC token, as described above with reference to block 312 of FIG. 3. The AC token is an identifier for the AC session which is used in future requests for access to the AC session. In the case that the Asynchronous Collaboration function 114 is coordinating multiple AC sessions at once, each will have a unique AC token that allows users to access the correct AC session. The Asynchronous Collaboration function 114 may send the newly created AC token to the Collaboration Coordination function 112, which may store the AC token in the database described above in a manner that associates it with the SC session that was identified to the Collaboration Coordination function 112 in action 414. In other embodiments, an AC session may already exist and be associated with the SC session. The Collaboration Coordination function 112 may detect this in a manner similar to that described above with reference to block 312 of FIG. 3. In such cases, actions 424-426 can be skipped.

Moving to action 428, the Collaboration Coordination function 112 sends a message to user A's user device 102 indicating, that the AC session is ready, and provides the AC token to user A's user device 102.

Moving to action 430, user A's user device 102 automatically accesses the AC session by providing the AC token to the Asynchronous Collaboration function 114, which connects user A's user device 102 to the AC session identified by the AC token. Moving to action 432, the AC function 116 sends a message to user A's user device 102 indicating that it is connected to the AC session.

Moving to action 434, user A participates in the AC session. User A's user device 102 and the Asynchronous Collaboration function 114 communicate back and forth to send the necessary information between the user device 102 and the Asynchronous Collaboration function 114 to facilitate user access to the AC session for asynchronous posting/adding and retrieving of messages, collaboration objects, and the like to and from the AC session. The information may include various types of files such as mp3, mp4, mpeg, productivity suite documents, pdf, and the like, as well as simple text messages, packaged as required for appropriate technologies such as FTP, HTTP, SFTP, or the like. The AC session may be overlapping in time with the SC session, e.g. actions 422 and 434 may overlap in time.

The Asynchronous Collaboration function 114 may check the user's privilege level before completing any actions for the user. When user A is a moderator, user A may also set a privilege level required to view or delete the post from the AC session and communicate the privilege level requirement to the Asynchronous Collaboration function 114.

Moving to action 436, a second user, called user B in this example, operating a user device 102, sends a request to the Collaboration Coordination function 112 to join the active SC session as a guest. This request may be initiated by activating an SC session hyperlink in a calendar appointment, meeting invite, or the like, which was provided to user B at an earlier time.

Moving to action 438, the Collaboration Coordination function 112 requests login credentials from user B. Moving to action 440, user B provides login credentials in the form of a user ID (e.g., user B's name, employee number, etc.), a privilege level (in this example, guest), and a password. Moving to action 442, Collaboration Coordination function 112 passes user B's login credentials to Authentication function 118, which authenticates user B's login credentials as described above. Moving to action 444, Authentication function 118 sends confirmation to Collaboration Coordination function 112 that user B's login credentials are valid. In other embodiments where the user's login credentials are invalid, the Authentication function 118 will return a denial of authentication to Collaboration Coordination function 112. In such a case, Collaboration Coordination function 112 may prompt user B for new login credentials. In other embodiments where the user is an external guest user, login credentials are not required but the user gains access only to guest user privileges.

The Collaboration Coordination function 112 may also request a notification address from user B at action 438. As described above, the notification address is used to send notifications to the notification client 106 of the user device 102. As described above, notifications may include various notifications such as an invitation to an SC session or a hyperlink to an AC session.

Moving to action 446, the Collaboration Coordination function 112 sends a message to user B's user device 102 indicating that the SC session is ready, and provides the SC token to user B's user device 102. Moving to action 448, user B's user device 102 accesses the SC session by providing the SC token to the Synchronous Collaboration function 116, which connects user B's user device 102 to the SC session identified by the provided SC token. Moving to action 450, the Synchronous Collaboration function 116 sends a notification to the notification client 106 of user B's user device 102 that it is connected to the SC session.

Moving, to action 452, user B participates in the SC session as a guest. The SC session is the same SC session accessed by user A in action 422. The Synchronous Collaboration function 116 may limit the privileges of user B due to their guest status, and user B may be subject to moderation by a moderator such as user A. User B's user device 102 and the Synchronous Collaboration function 116 communicate back and forth to send the necessary information between the user device 102 and the Synchronous Collaboration function 116 to facilitate real time synchronous communications, e.g. real time multimedia data transfer, with other participants of the SC session. The information may include voice data, video data, screensharing data, and the like, packaged as required for appropriate technologies such as Voice Over IP (VoIP), RDP, RTP, WebRTC, or any other protocol appropriate for real-time transfer of media.

Moving to action 454, upon connection of user B to the SC session, the Collaboration Coordination function 112 checks for an associated AC session. The Collaboration Coordination function 112 may, for example, access a database as described above with reference to step 312 of FIG. 3. The database may contain entries relating AC tokens representing active AC sessions to SC tokens representing active and scheduled SC sessions, and the Collaboration Coordination function 112 may query the database using the SC token of the SC session that user B is connecting to in order to find the associated AC token. Upon finding the associated AC token, the Collaboration Coordination function 112 automatically sends a message to user B's user device 102 indicating that the associated AC session is ready, and provides the AC token to user B's user device 102.

Moving to action 456, user B's user device 102 automatically accesses the AC session by providing the AC token to the Asynchronous Collaboration function 114, which connects user B's user device 102 to the AC session identified by the provided AC token. Moving to action 458, the AC function 116 sends a message to user B's user device 102 indicating that it is connected to the AC session.

Moving to action 460, user B participates in the AC session, which is the same AC session as accessed by user A in action 434. User B's user device 102 and the Asynchronous Collaboration function 114 communicate back and forth to send the necessary information between the user device 102 and the Asynchronous Collaboration function 114 to facilitate user access to the AC session for asynchronous posting/adding and retrieving of messages, collaboration objects, and the like to and from the AC session. The information may include various types of files such as mp3, mp4, mpeg, productivity suite documents, pdf, and the like, as well as simple text messages, packaged as required for appropriate technologies such as FTP, HTTP, SFTP, or the like. User B may be restricted by a moderator user such as user A from viewing or deleting certain posts from the AC session. The AC session may be overlapping in time with the SC session, e.g. actions 460 and 452 may overlap in time.

Any number of guest users may connect to and participate in the SC session and associated AC session in the manner described above in actions 436-460. There may be other privilege levels besides moderator and guest, such as sub-moderators that are still subject to the authority of the moderator but have limited moderation powers over guests. There may be more than one moderator with equivalent privileges. Users may have different privilege levels in the SC session than they do in the AC session. For example, a user may be a moderator in the SC session but a guest in the AC session, or vice versa.

FIG. 5 shows a signal diagram 500 illustrating how the Collaboration Coordination function 112 coordinates with the Asynchronous Collaboration function 114 and the Synchronous Collaboration function 116 to end an SC session. Beginning at action 502, the moderator of the SC session, user A in this example, sends a signal to the Collaboration Coordination function 112 indicating that he wishes to end the SC session. The signal includes the SC token identifying which SC session the user wishes to end.

Moving to action 504, the Collaboration Coordination function 112 sends a request to the Synchronous Collaboration function 116 to end the SC session. The request includes the SC token, identifying which SC session to end. Moving to action 506, the Synchronous Collaboration function 116 ends the SC session and sends a notification to the Collaboration Coordination function 112 that the indicated SC session has been ended. Moving to action 508, the Synchronous Collaboration function 116 may send a recording (or a link to the saved recording) of the SC session to the Collaboration Coordination function 112. The recording may include, for example, an mp3 of a voice call or voice conference call, an mpeg or mp4 of a video call or videoconference, or the like.

Moving to action 510, the Collaboration Coordination function 112 checks for an associated AC session. The Collaboration Coordination function 112 may, for example, access a database as described above with reference to step 312 of FIG. 3 and action 454 of FIG. 4. The Collaboration Coordination function 112 may query the database using the SC token of the SC session that the user is ending to discover the AC tokens of any associated AC sessions. In another example, user A may send both the SC token and the AC token for the associated AC session to the Collaboration Coordination function 112 in action 502. User A may maintain knowledge of both tokens after being connected to the SC and AC sessions.

Upon finding or receiving the AC token for the associated AC session, the Collaboration Coordination function 112 automatically sends a request to Asynchronous Collaboration function 114 to end the associated AC session, which in this case is the AC session that was automatically pushed to the users of the SC session in actions 432 and 458 of FIG. 4. The request includes the AC token, identifying which AC session to end. Moving to action 512, the Asynchronous Collaboration function 114 ends the AC session and sends a message to the Collaboration Coordination function 112 that the indicated AC session has been ended. When the AC session is ended, user A is no longer connected via his user device 102 with the Asynchronous Collaboration function 114. However, the information exchanged with and posted to the AC session is still available and can be accessed asynchronously at any time by user A or other participants to the AC session.

Moving to action 514, the Collaboration Coordination function 112 sends a message to user A's user device 102 informing it that the SC session has been ended. Moving to action 516, the Collaboration Coordination function 112 sends a message to user B's user device 102 informing it that the AC session has been ended. In some embodiments, ending the AC session includes disconnecting user devices 102 from the AC session, i.e. removing the AC session elements from the collaboration user interface 104. The data contained in the AC session remains, however, and may be accessed later in a manner described below.

Moving to action 518, the Collaboration Coordination function 112 may post details of the recently ended SC session to the AC session by sending the details to the Asynchronous Collaboration function 114. The session details may include, for example, a list of users who attended the SC session, which users were moderators, presenters, etc., the time the SC session began and ended, and the like. Moving to action 520, the Collaboration Coordination function 112 may post the recording of the SC session (as received in action 508) to the AC session by sending it to the Asynchronous Collaboration function 114. The details and recording of the SC session may be made available to users of the AC session that access the AC session at a later time. Some of the details of the SC session may also be used to initiate future SC sessions by, for example, using the list of users present in the previous SC session to automatically generate an invitation to a new SC session.

Moving to action 522, the Asynchronous Collaboration function 114 sends to the Collaboration Coordination function 112 a hyperlink to the AC session, which may be provided to users to allow them to access the AC session at any time. The hyperlink may point to a URL, an FTP address, or any other suitable address. The AC session hyperlink may be embedded with the user ID of the user, information identifying the AC session, or the like. Moving to action 524, the Collaboration Coordination function 112 sends a notification to the notification client 106 of user A's user device 102 that provides the AC session hyperlink to user A. Moving to action 526, the Collaboration Coordination function 112 sends a notification to the notification client 106 of user B's user device 102 that provides the AC session hyperlink to user B. At this point, user A and user B may use the AC session hyperlink to access the AC session at any time that they wish.

FIG. 6 shows a signal diagram 600 illustrating how users may access the AC session after an SC session has ended. It is noted that although only users A and B are shown in this illustration, any ones of the users who received the AC hyperlink may be able to access the AC session in the manner described by diagram 600.

Beginning at action 602, user B decides that he wishes to access the AC session, for example to post a new message or to retrieve a file for a project. User B, via his user device 102, activates or selects the AC session hyperlink that he received at action 526 of diagram 500. This causes user device 102 to connect to the Asynchronous Collaboration function 114, which in turn connects user B's user device 102 to the AC session identified by the AC session hyperlink. The AC session hyperlink may require the user to re-enter his login credentials in order to activate the hyperlink. The Asynchronous Collaboration function 114 may request login credentials from the user and send them to Authentication function 118 for verification before connecting to the AC session. Moving to action 604, the Asynchronous Collaboration function 114 sends a message to user B's user device 102 indicating that it is connected to the AC session.

Moving to action 606, user B participates in the AC session in a similar manner as that described in action 460 of diagram 400. User B's user device 102 and the Asynchronous Collaboration function 114 communicate back and forth to send the necessary information between the user device 102 and the Asynchronous Collaboration function 114 to facilitate asynchronous posting and retrieving of messages, collaboration objects, and the like to and from the AC session. The information may include various types of files such as mp3, mp4, mpeg, productivity suite documents, pdf, and the like, as well as simple text messages, packaged as required for appropriate technologies such as FTP, HTTP, SFTP, or the like. User B may be restricted by a moderator user such as user A from viewing or deleting certain posts from the AC session.

Moving to action 608, user B wishes to disconnect from the AC session, and sends from his user device 102 to the Asynchronous Collaboration function 114 a request to end the AC session. Moving to action 610, the Asynchronous Collaboration function 114 ends the AC session and sends a message to user B's user device 102 indicating that the AC session has been ended.

Moving to action 612, user A decides that he wishes to access the AC session, for example to post a new message, to retrieve a file for a project, to schedule a new SC session with the users who are participating in the AC session, or the like. It is noted that the AC session is asynchronous, so that user A and user B may access the AC session at different times, or they may access the AC session simultaneously. The process is similar to that described with respect to user B in actions 602-606 above. At action 612, user A, via his user device 102, activates or selects the AC session hyperlink that he received at action 526 of diagram 500. This causes user device 102 to connect to the Asynchronous Collaboration function 114, which in turn connects user A's user device 102 to the AC session identified by the AC session hyperlink. The AC session hyperlink may require the user to re-enter his login credentials in order to activate the hyperlink. The Asynchronous Collaboration function 114 may request login credentials from the user and send them to Authentication function 118 for verification before connecting to the AC session. Moving to action 614, the Asynchronous Collaboration function 114 sends a notification to the notification client 106 of user A's user device 102 that it is connected to the AC session.

Moving to action 616, user A participates in the AC session in a similar manner as described in action 460 of diagram 400. User A's user device 102 and the Asynchronous Collaboration function 114 communicate back and forth to send the necessary information between the user device 102 and the Asynchronous Collaboration function 114 to facilitate asynchronous posting and retrieving of messages, collaboration objects, and the like to and from the AC session. The information may include various types of files such as mp3, mp4, mpeg, productivity suite documents, pdf, and the like, as well as simple text messages, packaged as required for appropriate technologies such as FTP, HTTP, SFTP, or the like. User A as a moderator may be able to set restrictions on the actions that other non-moderator users such as user B may take within the AC session. For example, user A may be able to restrict user B from viewing, deleting, or posting messages, files, collaboration objects, or the like.

Moving to action 618, user A may schedule an invite for a future, or subsequent, SC session. User A as a moderator may be the only user of the AC session that is authorized to schedule an SC session. In other embodiments, any user or may schedule a new SC session, or a subset of authorized users may schedule a new SC session. User A may be able to designate a date, a time window, invited participants, and any other appropriate parameters for the SC session. Continuing with action 618, user A posts the meeting invite to the AC session by sending a request to post the invite to the Asynchronous Collaboration function 114. The request contains the SC session parameters. The future SC session will function similarly to the SC session described above with reference to FIGS. 3 and 4, and will have its own unique SC token which will be associated with the AC token of the AC session as described above.

Moving to action 620, the Asynchronous Collaboration function 114 retrieves the list of participants in the SC session and their notification addresses. In some embodiments, this may be the users of the AC session. In other embodiments, this may be a subset of users designated in the SC session parameters received at action 618.

Moving to actions 622 and 624, the Asynchronous Collaboration function 114 pushes a meeting invite for the new SC session to the notification addresses of user B and user A. In this example only users A and B are shown receiving the notification, but in other embodiments there may be a plurality of users of the AC session who receive the notification. In some embodiments, the notification contains an SC session hyperlink which users may activate to initiate the process of joining the SC session. Similar to action 436 of diagram 400 above, the SC session hyperlink may be contained in a calendar appointment, meeting invite, or the like.

Moving to action 625, the Asynchronous Collaboration function 114 sends user A's user device 102 a confirmation that the new SC session has been scheduled.

Moving to action 626, user A wishes to disconnect from the AC session, and sends from his user device 102 to the Asynchronous Collaboration function 114 a request to end the AC session. Moving to action 628, the Asynchronous Collaboration function 114 ends the AC session and sends a message to user A's user device 102 that the AC session has been ended.

Figure 7:
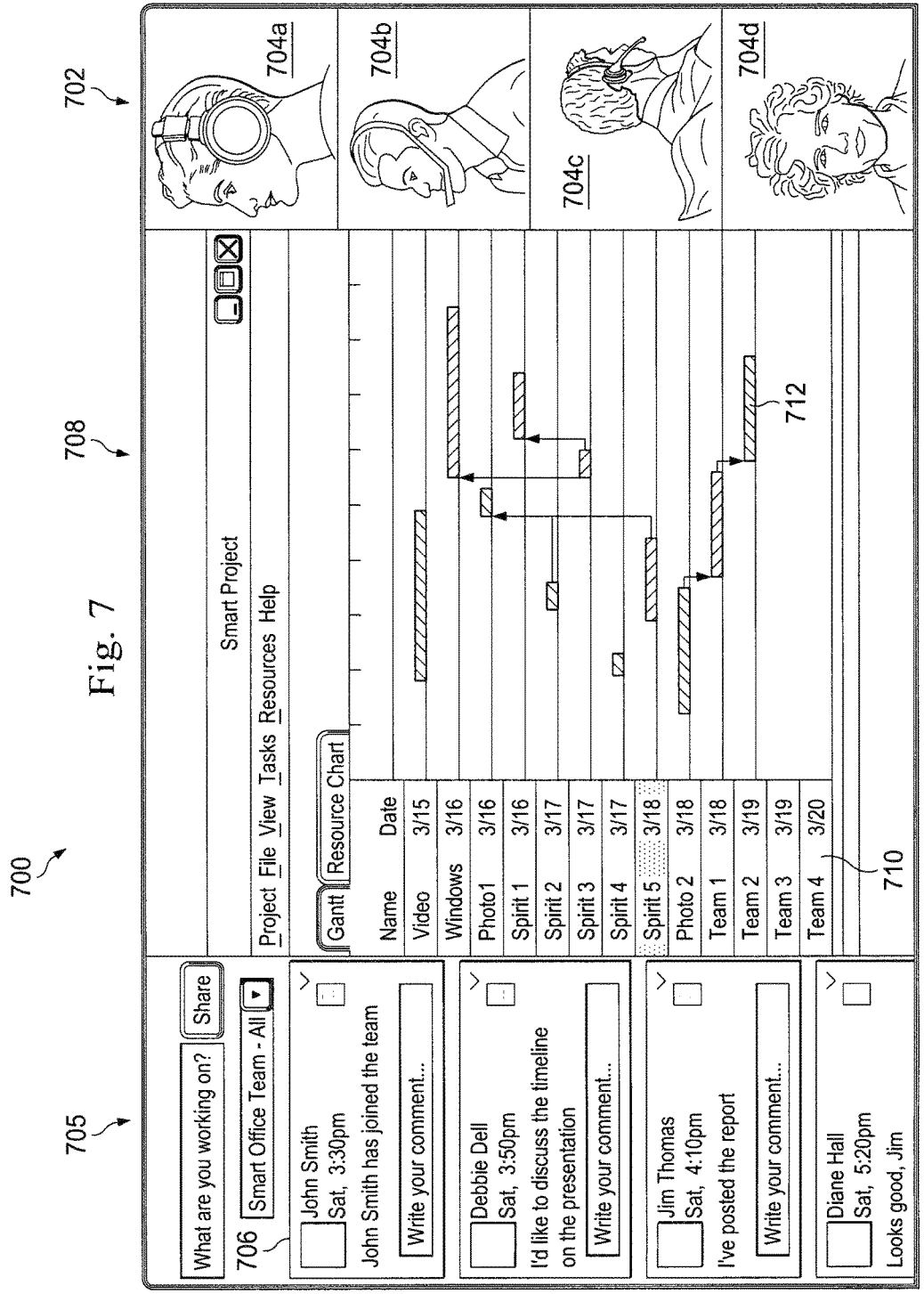
FIG. 7 is an illustration of an example user interface according to one embodiment.

FIG. 7 shows an example user interface (UI) 700 displayed on a user device 102 according to embodiments of the present disclosure. The UI 700 is displayed to a user during, for example, blocks 310 and 318 of FIG. 3 or action 434 or 460 of FIG. 4, when both the AC session and the SC session are simultaneously accessed by users. Accordingly, some elements of the UI 700 relate to AC session features and some relate to SC session features, which are displayed simultaneously on the same screen. As the AC session and the SC session are linked, each user that is connected to the AC and SC sessions may see a same or similar UI 700 on their respective user devices 102. For example, each user device 102 may be running a same client program which causes the same UI 700 to be displayed.

Synchronous element 702 displays UI elements related to a synchronous collaboration session. In cases where the SC session involves video conferencing, synchronous element 702 may display various video feeds 704*a-d* from other users. There may be multiple feeds 704*a-d* such that each user is displayed in one feed 704, a single feed 704 that displays only an active presenter (either a user who is currently talking or a user who is designated by a moderator). As part of the SC session, a shared desktop 708 feed either in place of or in addition to other feeds 704*a-d,* can be presented. In some embodiments, the multiple feeds 704*a-d* and 708 can be replaced by a single feed provided by the SC function and consisting of a composite view of the various video elements. In some embodiments, the position of synchronous elements 702 and asynchronous element 708 may be switched so that, for example, an active presenter or a desktop feed may occupy the large space of asynchronous element 708. When the SC session ends, synchronous elements 702 may be removed from the UI 700.

Asynchronous element 705 displays UI elements related to an asynchronous collaboration session. Asynchronous element 705 may display text messages 706 from the AC session and allow posting of new text messages to the AC session. Asynchronous element 708 may display various collaboration objects accessible from the AC session and allow posting of new collaboration objects to the AC session. For example, a listing of collaboration objects may appear in element 708 along with one or more collaboration objects 712 that has been selected from the listing. In another example, collaboration objects that are opened from the listing 710 may open in a separate window of any appropriate application.

As discussed above, the AC session may persist after the SC session ends. Accordingly, after the SC session ends and synchronous elements 702 are removed from the UI 700, asynchronous elements 705 and 708 may remain. Furthermore, if a user disconnects from the AC session and later reconnects, asynchronous elements 705 and 708 may reappear on the UI 700, reflecting any updates or other changes made by other users of the AC session since the last time the user accessed the AC session.

Various embodiments of the present disclosure may include advantages over prior solutions. The ability to link an SC session to an AC session that persists after the SC session ends improves efficiency of the users of the SC session and AC session by making it easy for them to retrieve information about the SC session, such as meeting minutes, a recording of the SC session, or a log of messages posted to the AC session during the SC session. Additionally, the ability to schedule a new SC session from an AC session improves efficiency by removing the need for a user to look up who to invite to a meeting for any given project, as well as by providing the accumulated AC session posts and collaboration objects to participants in any new SC session so that they do not have to take time to gather together materials for the project in question before the SC session begins. As users take on more simultaneous projects, having an AC session dedicated to each project will compound the benefits in terms of efficiency of organization and ease of communication between users working on projects together.

Furthermore, present embodiments solve a problem unique to network communications. For example, the need to organize recordings of SC sessions did not exist prior to the use of communication networks to conduct recordable network-based synchronous communications. In another example, the need to associate an SC session with an AC session did not exist prior to the use of high-speed and widely-available data communication networks to facilitate asynchronous sharing of information.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method comprising:
starting a synchronous communication session in response to user initiation, where the synchronous communication session includes real-time multimedia data transfer among a plurality of users associated with the synchronous communication session;
associating an asynchronous communication session with the synchronous communication session by associating identifiers of the asynchronous communication session and the synchronous communication session with each other;
providing the plurality of users with automatic access to the associated asynchronous communication session, the asynchronous communication session overlapping in time with the synchronous communication session and the automatic access including access to add information to the asynchronous communication session or retrieve information from the asynchronous communication session while the synchronous communication session is ongoing;
ending the synchronous communication session;
sending a digital link over a network to the plurality of users associated with the synchronous communication session, the digital link providing access to the asynchronous communication session; and
granting access to ones of the users for the asynchronous communication session in response to selection of the digital link.

2. The method of claim 1, wherein associating the identifiers includes creating a relationship between an alphanumeric string identifying the synchronous communication session and an alphanumeric string identifying the asynchronous communication session.

3. The method of claim 1, wherein providing automatic access to the asynchronous communication session is performed simultaneously with starting the synchronous communication session.

4. The method of claim 1, further comprising starting the asynchronous communication session prior to starting the synchronous communication session.

5. The method of claim 1, further comprising:
starting a plurality of additional asynchronous communication sessions prior to starting the synchronous communication session, wherein
starting the synchronous communication session includes selecting one of the plurality of additional asynchronous communication sessions for user access.

6. The method of claim 1, further comprising:
presenting the synchronous communication session and the asynchronous communication session to each of the plurality of users in a single user interface such that each of the plurality of users interact with the synchronous communication session and the asynchronous communication session simultaneously.

7. The method of claim 1, wherein sending the digital link to the plurality of users associated with the synchronous communication session includes sending the digital link to a notification address for each of the plurality of users associated with the synchronous communication session.

8. The method of claim 7, further comprising:
receiving from each of the plurality of users respective notification address.

9. The method of claim 1, wherein providing the automatic access includes providing access to add to and to retrieve from the asynchronous communication session one or more collaboration objects.

10. A computing device, comprising:
a memory containing a machine readable medium comprising machine executable code having stored thereon instructions for performing a method of linking a synchronous communication session with an asynchronous communication session; and
a processor coupled to the memory, the processor configured to execute the machine executable code to:
establish a synchronous communication session including sending and receiving real-time multimedia data among a plurality of users associated with the synchronous communication session;
associate an asynchronous communication session with the synchronous communication session by associating identifiers of the asynchronous communication session and the synchronous communication session with each other; and
provide the plurality of users with automatic access to the asynchronous communication session associated with the synchronous communication session to allow the plurality of users to post information to the asynchronous communication session or retrieve information from the asynchronous communication session while the synchronous communication session is ongoing.

11. The computing device of claim 10, wherein the processor is further configured to execute the machine executable code to end the synchronous communication session, while allowing the asynchronous communication session to persist after the end of the synchronous communication session.

12. The computing device of claim 10, wherein the synchronous communication session includes one or more of a voice call, a video call, a voice conference call, a video conference call, screen sharing, and a webcast.

13. The computing device of claim 10, wherein the processor is further configured to execute the machine executable code to:
in response to further user request, establish another synchronous communication session including real-time multimedia data transfer among another plurality of users associated with the other synchronous communication session; and
provide the other plurality of users with automatic access to the asynchronous communication session.

14. The computing device of claim 10, wherein
the processor is further configured to execute the machine executable code to:
assign a privilege level to a user of the plurality of users; and
based upon the privilege level, restrict the user's access to do one or more of adding collaboration objects, retrieving collaboration objects, deleting collaboration objects, adding comments, deleting comments, or viewing comments and collaboration objects.

15. A computer program product having a non-transitory computer readable medium tangibly recording computer program logic, the computer program product comprising:
code to connect first and second users to a synchronous communication session in response to a request from one of the first and second users, where the synchronous communication session includes one or more of real-time video, audio, and screensharing between the first and second users;

code to associate an asynchronous communication session with the synchronous communication session by associating identifiers of the asynchronous communication session and the synchronous communication session with each other; and code to automatically connect the first and second users with the asynchronous communication session, the asynchronous communication session overlapping in time with the synchronous communication session, code to enable the first and second users to add or retrieve text communication and collaboration objects from the asynchronous communication session while the synchronous communication session is ongoing;

code to generate a digital link providing access to the asynchronous communication session;

code to end the synchronous communication session;

code to send the digital link over a network to the first and second users in response to ending the synchronous communication session; and code to grant access to the first and second users, in response to selection of the digital link, for the asynchronous communication session after the synchronous communication session has ended.

16. The computer program product of claim 15, wherein the code to associate creates a relationship between an alphanumeric string identifying of the synchronous communication session and an alphanumeric string identifying of the asynchronous communication session within an accessible data structure.

17. The computer program product of claim 15, wherein the collaboration objects include at least one of: meeting minutes, a list of team members associated with a project, a schedule, or a recording of the synchronous communication session.

18. The computer program product of claim 15, further comprising:

code to begin a subsequent synchronous communication session in response to further user request, where the subsequent synchronous communication session includes real-time multimedia data transfer between at least the first and second users; and code to send an additional digital link over the network to the first and second users after the subsequent synchronous communication session has ended, the additional link providing access to the asynchronous communication session.

19. The computer program product of claim 18, wherein a plurality of users in addition to the first and second users participate in the subsequent synchronous communication session and receive the additional digital link.

20. The computer program product of claim 15, further comprising code to assign a privilege level to each of the first and second users.

* * * * *